May 11, 1937. E. JACOBSON 2,079,710
SELF FLUXING SOLDER AND PROCESS AND APPARATUS FOR PRODUCING SAME
Filed Jan. 23, 1934
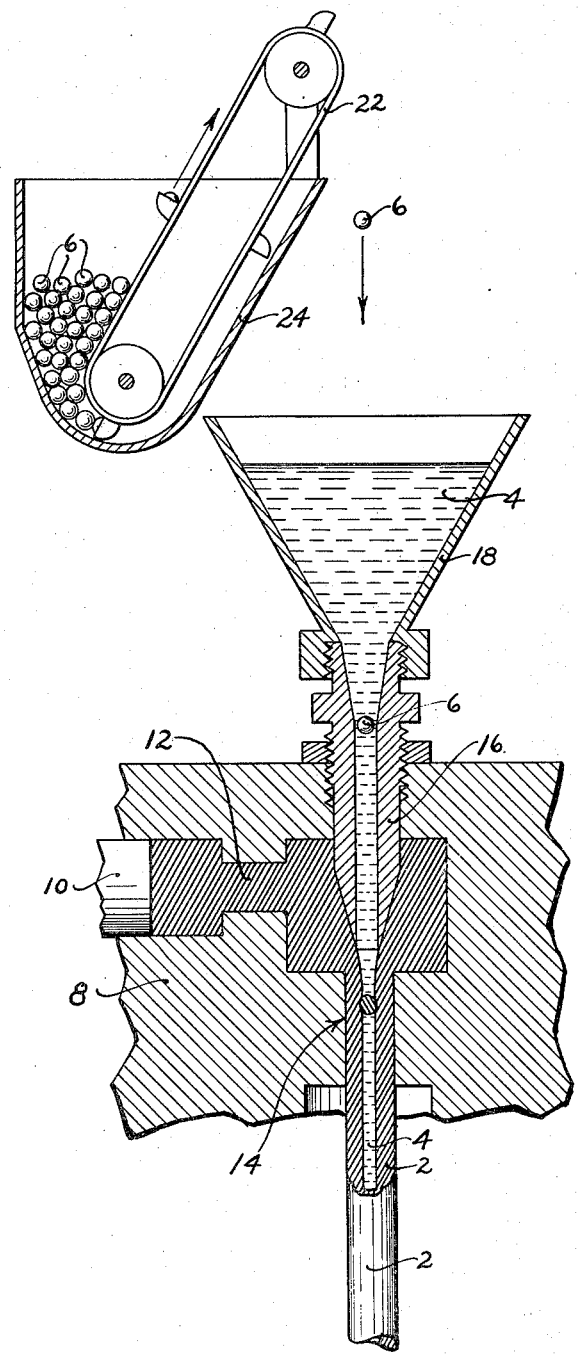
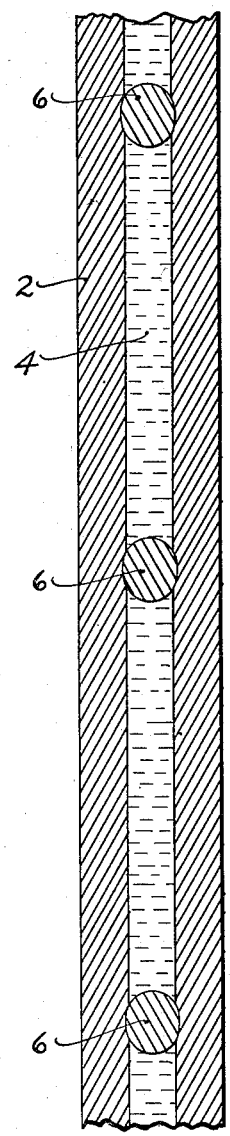
INVENTOR,
Eugene Jacobson

Patented May 11, 1937

2,079,710

UNITED STATES PATENT OFFICE 2,079,710

SELF-FLUXING SOLDER AND PROCESS AND APPARATUS FOR PRODUCING SAME

Eugene Jacobson, San Francisco, Calif.

Application January 23, 1934, Serial No. 707,889

11 Claims. (Cl. 207—10)

My invention relates to self-fluxing, or flux-core solders wherein the flux is contained in the solder and to processes and apparatus for producing the same.

This invention was conceived in an effort to provide a self-fluxing solder and particularly a flux-core wire solder, wherein the flux was really isolated into cells to prevent leakage of liquid or powdered flux and for other purposes.

Since the first use of flux-core solder many attempts have been made to isolate the flux imperviously into cells with but questionable success. Patent Number 628,541 issued July 11th, 1899 to Jesse F. Kester and Patent Number 1,615,094 issued January 18th, 1927 to Robert E. McFarland, are representative of previous attempts to accomplish certain of the objects of the present invention. It is now more or less common practice in conformity with aforementioned Patent Number 1,615,094, to attempt to isolate the flux in flux-core solder by pinching the finished tube of flux-core solder at intervals, for example by running the tube between a pair of toothed wheels. By that means the tube is greatly weakened, and even so the joints between the cells are never really leakproof. There always remains a thin layer of flux between the pinched walls of the tube. It is an object of my invention to improve upon this past practice. It is an object of my invention to prevent leakage of flux out of or of air into the core of flux-core solder. It is an object of my invention to provide a cellular or flux-core solder in which the cells are really isolated from each other. It is a further object of my invention to provide a cellular flux-core solder of superior mechanical strength.

Further objects of my invention are to provide improved apparatus and to provide improved processes for making cellular flux-core solder, and especially for making an improved quality of product and for making the product more efficiently and cheaply.

Other and ancillary objects of my invention will be suggested by the following description and in the use and practice of my invention.

Referring to the drawing:

Fig. 1 is a median vertical section of the discharge portion of an extrusion press incorporating my invention. Fig. 2 is a median longitudinal section of flux-core solder wire incorporating my invention.

The product of my invention in its preferred form is shown in Fig. 2, as a hollow tube 2, of solder with a flux-core 4. Cylindrical tubing is illustrated and preferred but other shapes are tolerable. Any suitable flux may be employed, such for example as rosin or resin in powdered, solid or plastic form, any of the synthetic fluxes, or metallic salt fluxes. For purposes of the present description, the flux 4 will be considered as an aqueous solution of zinc chloride in permanently liquid form. The term permanently liquid is employed to distinguish from the frequent practice of introducing fluxes in molten or liquid form even though that liquid stage may give way to a permanently solid plastic or powdered form, as in the case of rosin, when the flux-core solder has cooled after manufacture.

In the product of my invention the core of flux 4, instead of being continuously of one material is broken by interposition of slugs or plugs 6 of a different material at intervals along the length of the tube. With a liquid core of zinc chloride solution for example, slugs of rosin, resinous material, grease or the like might be used, but it is emphasized that these are slugs distinct from the body of the flux, that they are large enough and dense enough to block off the core and separate the body of flux into sections, and that they are not dissolved, compounded, or otherwise intimaterly dispersed thereinto. The spacing of these slugs is optional. I prefer to space them about six inches apart in the solder tube, but they may be spaced further apart or closer together as desired.

As a refinement of and improvement upon the foregoing broadly stated expedient of introducing slugs of a material different from the body of the flux-core at intervals along the core, it is preferred that these slugs 6 be pellets of solder, and they are illustrated and described as such herein. For some purposes it might be desirable to compound these pellets of a solder having a higher or lower melting point than the body of the tube 2, but for present purposes it is preferred that the pellets or slugs 6 be solder of the same composition as that of tube 2. The flux cells are thus enclosed in a matrix of solder which separates and isolates the cells from each other. The pellets are very slightly larger than the inside diameter of tube 2 so that they are pressed tightly by the walls of the tube. Were it desired to make short single-cell capsules of solder filled with flux, it would merely be necessary to sever the tube 2 through the middle of slugs 6, or between two juxtaposed slugs. If the solder tube is to be sealed only at its two ends, it would suffice to use only two slugs 6 for each length or coil of solder wire; positioning one at or near each end thereof.

The improved solder of my invention is formed by alternately feeding flux material and slug or plug material into the core or bore of the solder tube. Preferably this is done while the solder tube is being formed. It is preferred to feed the flux material in molten or liquid form and to feed the slug or plug material in solid form especially where solder is used for the plug material. It is recognized however, that in certain instances, especially where rosin or resinous substance is used as the plug material, it may be desirable to feed the latter also in molten or liquid form, allowing it to solidify or plasticize within the solder tube. The flux and slug materials are fed in alternately in the described embodiment of my invention, though it would be possible to feed the materials simultaneously if they be immiscible, and allow the slugs to separate out in the finished solder tube.

In the described embodiment of my invention the slug material is in the form of solder pellets which are merely fed in periodically through the same opening as the liquid flux material. It is not necessary in this instance externally to shut off the flow of flux. The pellets themselves displace the flux as they roll into the core of the solder.

While it is preferred to extrude the solder sheath around the flux and plugs, under high pressure from a semi-solid mass of solder, it might be possible instead of extruding to form the solder sheath by flowing molten solder out of an opening under the effect of gravity or centrifugal force instead; while feeding the flux core and plugs as aforedescribed. It would also be possible to feed the flux and plug materials into a finished tube of solder. The finished tube with its flux and plugs made by any desired process can of course, subsequently be rolled or otherwise reduced to smaller diameter or different shape, just as with a flux core solder having no plugs therein.

The apparatus of my invention combine with conventional apparatus for making flux-core solder, means for feeding plug material into the core of the solder while it is being formed.

A flux-core solder extrusion press shown in Fig. 1 has a cylinder 8 and plunger 10 for feeding a semi-molten mass 12 of solder at very high pressure out through the discharge opening 14 of the extrusion press. Means for operating the plunger include a hydraulic pressure cylinder, and a high pressure pump therefor driven by an electric motor, all of which are old and well known and are accordingly not shown nor described in detail herein. A flux-feeding nozzle 16 is provided with its orifice close to and in line with the discharge opening 14. Location of the nozzle 16 near the discharge opening 14 causes a core to be formed in the tube of solder being extruded, and flux flows from the orifice of nozzle 16 into that core.

The nozzle 16 is spaced slightly further away from the opening 14 than would otherwise be conventional practice, to insure that the core formed in the solder tube will be somewhat smaller than the orifice of nozzle 16. It is conventional practice in flux-core solder presses to use a nozzle 16 with an orifice smaller than the diameter of core to be formed in the solder tube, and in setting up the press prior to each run, to adjust the size of core by adjusting the distance of the nozzle from discharge opening 14. Similarly in the practice of my invention, the nozzle is adjusted toward or from opening 14 to vary the size of the core, but instead of using an orifice smaller than the diameter of core, I prefer an orifice in nozzle 16 larger than the diameter of core to be formed in the solder tube 2. The nozzle 16 is threaded into cylinder 8 and by that means is adjustable toward or from the opening 14. The nozzle 16 at its outer end communicates with a hopper-shaped flux container 18 which is screw-threaded onto the upper end of the nozzle. Molten rosin, zinc chloride solution or other flux 4 is fed into the container 18. A valve, (not shown) is provided, as is customary, at the base of container 18 to shut off the flow of flux when desired. The container 18 may be encased in a steam-heating jacket if desired, and the flux may be maintained under pressure. These expedients are old and well-known so have not been illustrated.

Means have been provided for periodically feeding pellets of solder 6 such as solder shot into the container 18. A miniature bucket conveyor 22 picks up the solder pellets from a hopper 24 and drops them one at a time into the container 18. Each bucket on the conveyor will hold only one solder pellet. The conveyor is driven by a miniature electric motor (not shown) and is started and stopped by the same electric switch which controls the entire extrusion press so that the conveyor will be started and stopped at the same time as the whole extrusion press.

As the press operates solder is extruded out through opening 14 with a core formed therein by nozzle 16. Flux 4 flows from container 18 out through the orifice in nozzle 16 filling the core of the extruded solder with flux. Periodically, a pellet 6 of solder is dropped into the container 18 by conveyor 22 and sinks down through the liquid flux, out through the orifice in nozzle 16 and into the core of the solder being extruded. The pellets 6 are slightly smaller than the orifice in nozzle 16, but slightly larger than the core in the extruded solder so that the solder sheath is pressed tightly around the pellets 6. The pellets accordingly separate the flux-core of the solder tube into sections and act as plugs therefor.

It is preferred to form the solder pellets separately so they may be more accurately sized, but it is contemplated that these pellets may be formed as they are to be used by substituting for conveyor 22, a device described but not illustrated, to wit: a small heated pot full of molten solder having a gravity feed controlled by a heated needle valve and discharging molten solder one drop at a time into the body of flux in container 18 where the drops would be frozen into pellets by the relatively cool flux and pass through in the same manner as the pellets previously described. Size of the drops of molten solder and of the resulting pellets would be controlled by the temperature of the molten solder and by the size and shape of discharge opening or tit at the outlet from the needle valve. As additional safeguard, a foraminated sizing screen could be placed across the flux container 18 ahead of the outlet thereof. Since it is contemplated that plug materials other than solder may be fed into the core solder the foregoing drip arrangement will be instructive as to one means by which rosin, resinous materials or the like might be introduced into the solder along with a flux of dissimilar material.

When feeding rosin or a synthetic resin for example along with an aqueous solution of zinc chloride, the container 18 could be filled with zinc chloride solution and the rosin or resin dripped into the body of zinc chloride solution one or a few drops at a time. The major body of flux such as the zinc chloride solution would be maintained above or below the melting point of the plug material as conditions dictated. If miscible dissimilar materials are to be fed alternately however, it would be desirable to provide a second container alongside of and in parallel to container 18 similarly connected into nozzle 16, but with a two-way valve for selectively opening either of the two containers into nozzle 16. The two parallel containers would then be filled one with each of the two dissimilar materials to be fed alternately into the solder core.

When the plug material is to be introduced while still molten into the solder core, it will not be necessary to use an orifice in nozzle 16 larger than the diameter of core in the finished solder tube.

Spacing of the pellets 6 in the finished solder can be altered by altering the speed of conveyor 22, or by manual feeding of the pellets.

I have described one embodiment of my invention in detail, but it is emphasized that this embodiment is illustrative and not inclusive of all the forms my invention may assume. Certain of the objects, or certain portions or combinations of the objects of my invention may be attained with the use of less than all its advantageous features or with modifications within its purview. It is petitioned that my invention be limited only by the claims constituting its final determination.

I claim:

1. A process of making flux-core solder including the steps of consecutively introducing flux and a plug into the bore of a solder tube.

2. A method of making flux-core solder which includes the steps of feeding a core and periodically feeding plugs for said core into the bore of a solder tube.

3. A process of making flux-core solder including the steps of introducing flux into the bore of a solder tube and also introducing into the bore of said tube a plug-forming material immiscible with said flux and separate and distinct from said tube and adapted to separate the bore of said tube into a plurality of plugged sections.

4. In a method of making flux-core solder the steps of feeding a core and periodically feeding plugs for said core while flowing a sheath of solder therearound.

5. A method of making flux-core solder which comprises feeding a core and periodically feeding plugs for said core while extruding a sheath of solder therearound.

6. A method of making flux-core solder which comprises feeding a core and periodically feeding plugs of solder for said core while extruding a sheath of solder around said core and in hermetically enwrapping contact with said plugs.

7. In combination with a machine for making flux-core solder including a flux-feeding device, means associated with said device for periodically feeding slugs of plug material with but distinct from said flux.

8. A device for manufacturing flux-core solder including a chamber having an opening therein from which solder is adapted to flow, a flux-feeding nozzle in line with said opening adapted to discharge flux in the form of a core into the solder flowing through said opening, means for feeding flux while in liquid form to said nozzle and means for periodically feeding pellets of solid solder to said nozzle; said nozzle having an orifice only slightly larger than said pellets and said orifice being positioned sufficiently distant from said opening to allow contraction of the stream of flux therefrom to smaller area than the area of said orifice.

9. Self-fluxing solder including in combination, a tube of solder and a flux core of longitudinally alternating different materials separate and distinct from said tube in the bore thereof.

10. A length of flux core solder including a tube of solder, a flux core in said tube, and a plurality of plugs in and separate and distinct from said tube in the bore thereof to prevent leakage of flux.

11. Self-fluxing solder including in combination, a tube of solder, a flux core in said tube, and a series of plugs separate and distinct from said tube in the bore thereof to prevent leakage of flux.

EUGENE JACOBSON.